United States Patent [19]

Shimizu et al.

[11] Patent Number: 4,914,610

[45] Date of Patent: Apr. 3, 1990

[54] DISPLACEMENT MEASURING APPARATUS

[75] Inventors: Giichiro Shimizu; Toshiharu Okuyama; Yoshio Wakatsuki, all of Tokyo, Japan

[73] Assignee: Man Design Co., Ltd., Tokyo, Japan

[21] Appl. No.: 223,407

[22] Filed: Jul. 25, 1988

[30] Foreign Application Priority Data

Jul. 30, 1987 [JP] Japan .................. 62-117096[U]

[51] Int. Cl.⁴ .................. G06F 15/36; G01F 25/00; G05B 19/28
[52] U.S. Cl. .................. 364/561; 364/571.01; 33/504; 33/505; 73/1 J; 377/17
[58] Field of Search ............ 364/560, 561, 570, 571.01, 364/571.06; 33/503–505; 73/1 J; 377/17

[56] References Cited

U.S. PATENT DOCUMENTS

| | | | |
|---|---|---|---|
| 3,891,918 | 6/1975 | Ellis | 324/34 D |
| 4,550,518 | 10/1985 | Deis | 364/561 |
| 4,587,622 | 5/1986 | Herzog | 364/561 |
| 4,602,196 | 7/1986 | Matsui | 364/561 |
| 4,608,657 | 8/1986 | Manome et al. | 364/571.01 |
| 4,736,313 | 4/1988 | Nishimura et al. | 364/561 |

FOREIGN PATENT DOCUMENTS

| | | |
|---|---|---|
| 3107439A1 | 8/1981 | Fed. Rep. of Germany . |
| 3210890A1 | 3/1982 | Fed. Rep. of Germany . |
| 3519978A1 | 6/1985 | Fed. Rep. of Germany . |
| 3410292A1 | 9/1985 | Fed. Rep. of Germany . |
| 2008773A | 6/1979 | United Kingdom . |

*Primary Examiner*—Gary Chin
*Assistant Examiner*—Brian M. Mattson
*Attorney, Agent, or Firm*—Nixon & Vanderhye

[57] ABSTRACT

When a probe of a displacement measuring apparatus is moved, a core member connected to the probe is also moved through coils of an oscillator. A movement distance of the probe is calculated in accordance with a change in an oscillation frequency generated in correpondence with the movement of the core member. If strict displacement measuring is to be performed, the non-linear relationship between the moving distance of the core member and the change in the oscillation frequency must be taken into account, i.e., the relationship therebetween is measured in linear manner, the movement distance is calculated and then secondary curvature correction is performed to correct for the linear measurement. Therefore, measurement precision of the displacement measuring apparatus can be greatly improved as compared to that of a conventional displacement measuring apparatus.

5 Claims, 6 Drawing Sheets

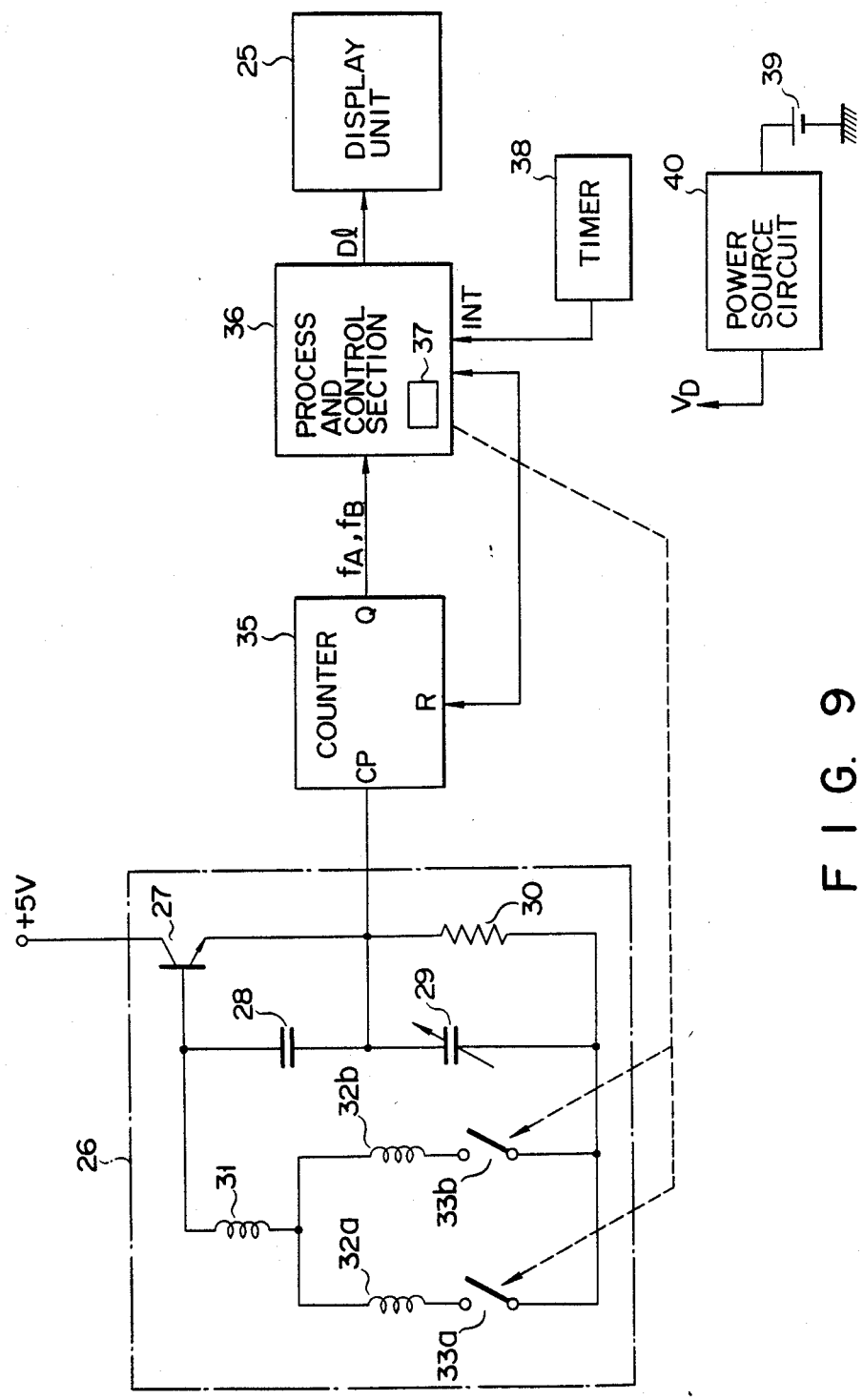
F I G. 9

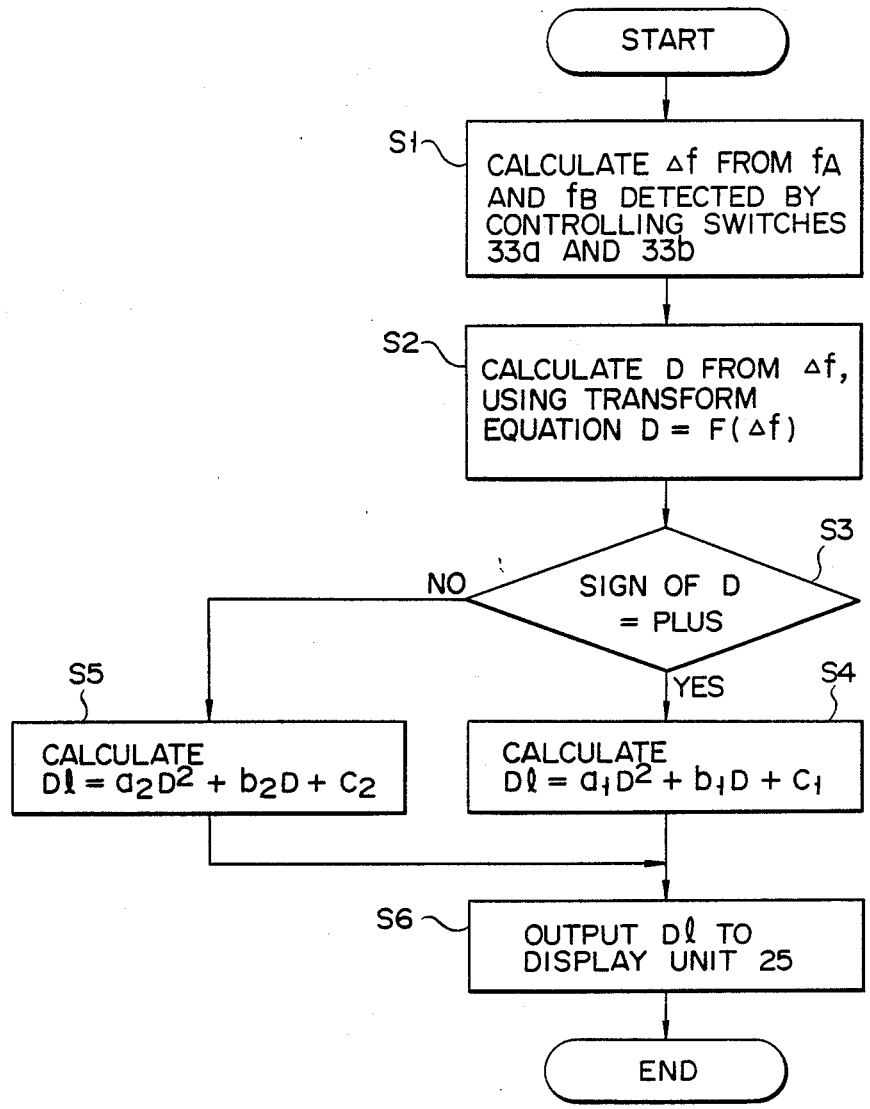
F I G. 12

4,914,610

DISPLACEMENT MEASURING APPARATUS

BACKGROUND OF THE INVENTION

1. Field of the Invention

The present invention relates to a displacement measuring apparatus for calculating a movement distance of a probe brought into contact with an object in accordance with a change in oscillation frequency of an oscillator and, more particularly, to a displacement measuring apparatus for correcting a secondary curve so that the calculated movement distance is approximate to a true movement distance of the probe.

2. Description of the Related Art

A dial gauge shown in FIG. 1 is known as a portable displacement measuring apparatus for accurately measuring a very short movement distance, for example, 0.1 mm or 0.01 mm, of an object. Displacement measuring apparatus 1 represented by such a dial gauge digitally displays a movement distance of probe 2 from a reference position on display unit 3. The movement distance of probe 2 is detected as an electrical signal corresponding to a change of an oscillation frequency of an oscillator incorporated in displacement measuring apparatus 1. More specifically, as shown in FIG. 2, core member 4 is joined with a shaft for supporting probe 2, primary coil 5 and two secondary coils 6a and 6b which are wound around core member 4. Coils 5, 6a, and 6b are arranged as shown in FIG. 3. An AC signal having a predetermined frequency is applied to primary coil 5 from oscillator 7, so that inductance L can be detected from output terminals 8a and 8b of secondary coils 6a and 6b. Therefore, when core member 4 is moved up and down, inductance L between output terminals 8a and 8b is changed.

FIG. 4 is a schematic view of displacement measuring apparatus 1. Colpitts oscillator 9, as shown in FIG. 5, comprises inductor L between output terminals 8a and 8b, capacitor C1, variable capacitor C2, and transistor Tr. The relationship between change in oscillation frequency f of the oscillator 9 generated in accordance with movement of core member 4 joined with probe 2 through coils 5, 6a, and 6b, and movement distance D of core member 4 from a reference position (central position) is linear, as represented by a solid line shown in FIG. 6. Therefore, movement distance D can be calculated in accordance with change of oscillation frequency. Oscillation frequency f of oscillator 9 is counted by counter 10, and movement distance D is digitally calculated by process section 11 in accordance with transform characteristics as indicated by the solid line in FIG. 6. The calculation result is displayed on display unit 12.

The following problem occurs in the displacement measuring apparatus for calculating movement distance D of probe 2 in accordance with the change in oscillation frequency f of oscillator 9 generated in correspondence with movement of core member 4 joined with probe 2 through coils 5, 6a, and 6b. As described above, in order to accurately calculate movement distance D of probe 2 using the displacement measuring apparatus, the relationship between the true movement distance of core member 4 from the reference point and change of oscillation frequency f must be completely linear, as indicated by the solid line in FIG. 6.

However, the relationship between movement distance D of probe 2 and change of the oscillation frequency f is not linear due to disturbance in lines of magnetic field among coils 5, 6a, and 6b, an edge effect on both ends of core member 4, or the like, as indicated by a dotted curve in FIG. 6. FIG. 7 is an enlarged graph showing a relationship between true movement distance l of probe 2, i.e. core member 4 for D=0 and error (l−D) obtained by subtracting movement distance D calculated from true movement distance l. As shown in FIG. 7, error (l−D) is curvilinearly changed with respect to true movement distance l and maximum error reaches about 20 $\mu$m (0.02 mm). Note that when a capacitance of variable capacitor C2 is changed, a gradient of a straight line in FIG. 6 is also changed, but the maximum error of 20 $\mu$m in FIG. 7 is hardly changed.

This displacement measuring apparatus having maximum error of 0.02 mm satisfies a standard of a measuring apparatus for measuring a length. Therefore, this error is allowed in usual measuring processes.

When a measurement precision of about 1/100 mm in measurement for a vibration magnitude upon rotation of a rotation shaft of a high-precision component is required, however, the above error is not allowed.

As has been described above, it is required that a displacement measuring apparatus which can greatly improve the conventional measurement precision be developed.

SUMMARY OF THE INVENTION

It is an object of the present invention to provide a displacement measuring apparatus for applying a secondary curvature correction to a movement distance calculated in accordance with a change in an oscillation frequency of an oscillator so that the obtained movement distance can be approximate to a true movement distance, thus improving measurement precision.

According to the present invention, there is provided a displacement measuring apparatus comprising a probe means for contacting an object, a core means coupled to the probe means, an oscillator means including a coil in which the core means is inserted, a counter means for counting an oscillation frequency of the oscillator means, a movement distance calculating means for calculating a movement distance of the probe means in accordance with a change in the oscillation frequency of the oscillator means generated in correspondence with a movement of the core means through the coil, a movement distance correcting means for correcting the movement distance calculated by the movement distance calculating means, and display means for displaying the movement distance corrected by the movement distance correcting means.

BRIEF DESCRIPTION OF THE DRAWINGS

FIG. 9 is a block diagram showing an arrangement of the displacement measuring apparatus according to the embodiment of the present invention;

FIG. 12 is a flow chart for explaining an operation of the calculation control section shown in FIG. 9.

DETAILED DESCRIPTION OF THE PREFERRED EMBODIMENT

An embodiment of the present invention will be described below with reference to the accompanying drawings.

Figure 8:
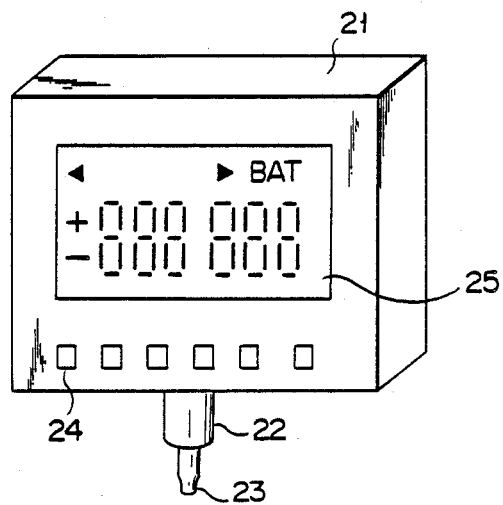
FIG. 8 is a view showing an outer appearance of a displacement measuring apparatus according to an embodiment of the present invention.

FIG. 8 is a view showing an outer appearance of a displacement measuring apparatus according to the embodiment of the present invention. Probe 23 is joined with the lower surface of casing 21 having a substantially rectangular parallelepiped shape through guide shaft 22, and moves up and down with respect to casing 21. Various function keys 24 for mode selection, zero point adjustment, and the like and display unit 25 composed of liquid crystal display elements are installed in the front surface of casing 21. Note that display unit 25 has a function for displaying segment display of 6 digits representing a movement distance measured by probe 23.

Figure 10:
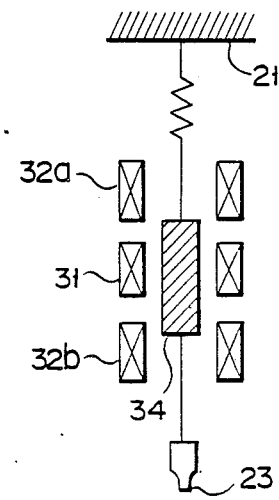
FIG. 10 is a view showing a positional relationship between coils and a core member in the displacement measuring apparatus according to the present invention.

FIG. 9 is a schematic block diagram showing an arrangement of the displacement measuring apparatus. In Colpitts oscillator 26 having a known arrangement shown in FIG. 9, capacitors 28 and 29 and resistor 30 are connected on the base-emitter path of transistor 27, and one end of primary coil 31 is connected to the base of transistor 27. A circuit of secondary coil 32a and switch 33a and a circuit of secondary coil 32b and switch 33b are connected in parallel between the other end of primary coil 31 and resistor 30. Secondary coils 32a and 32b have an identical impedance. Primary coil 31 and secondary coils 32a and 32b are arranged such that two secondary coils 32a and 32b vertically sandwich primary coil 31, as shown in FIG. 10. Core member 34 joined with the shaft of probe 23 is inserted through coils 31, 32a, and 32b. Core member 34 is arranged on the upper portion inward casing 21 through the shaft and a spring. Therefore, when probe 23 is moved upward, core member 34 is moved toward secondary coil 32a so that a coupling capacitance between primary coil 31 and secondary coil 32a is increased. However, when probe 23 is moved downward, core member 34 is moved toward secondary coil 32b so that a coupling capacitance between primary coil 31 and secondary coil 32b is increased.

Figure 1:
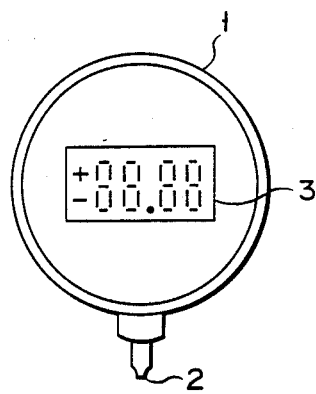
FIG. 1 is a view showing an outer appearance of a conventional displacement measuring apparatus.
Figure 2:
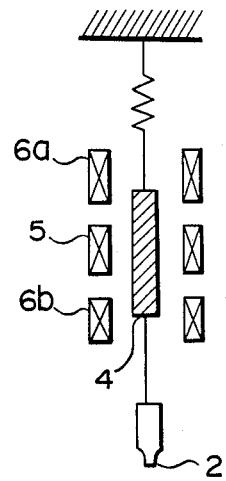
FIGS. 2 and 3 are views showing a positional relationship between coils and a core member in the conventional displacement measuring apparatus.
Figure 3:
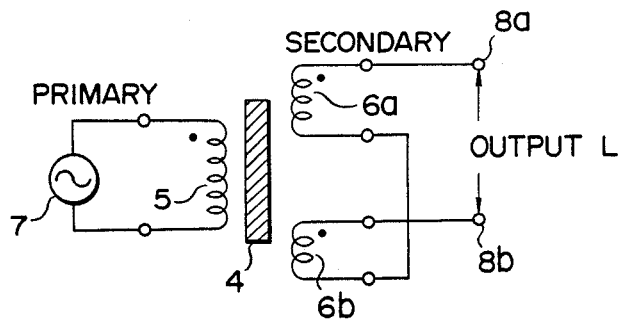
Figure 4:
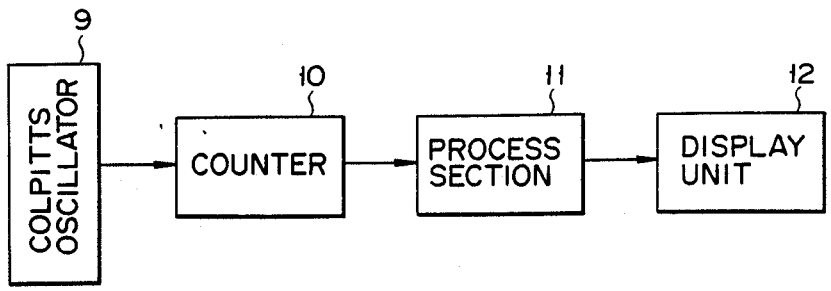
FIG. 4 is a block diagram showing an arrangement of the conventional displacement measuring apparatus.
Figure 5:
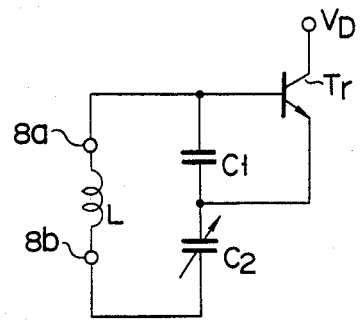
FIG. 5 is a diagram showing a circuit arrangement of an oscillator shown in FIG. 4.
Figure 6:
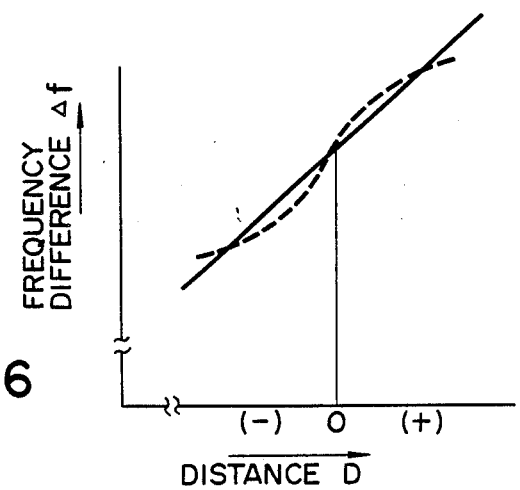
FIG. 6 is a graph showing a relationship between a change in an oscillation frequency of the oscillator and a movement distance of the core member.
Figure 7:
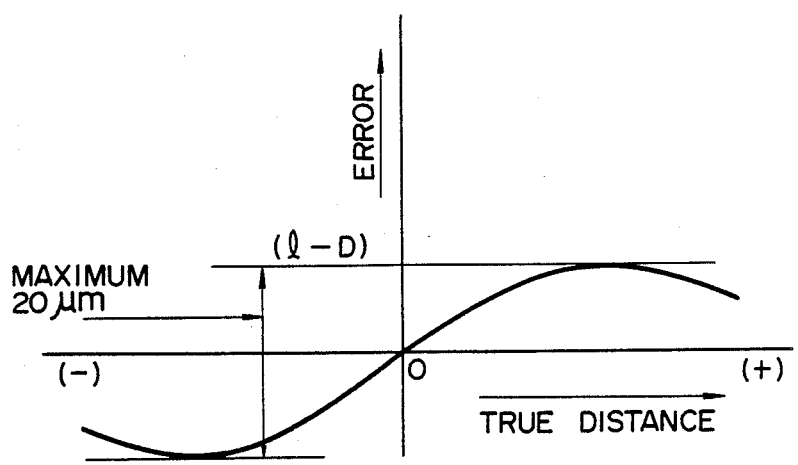
FIG. 7 is a graph showing a relationship between an error and a true movement distance.

When core member 34 is located at the central position (reference position) of primary coil 31, oscillation frequency $f_A$ of Colpitts oscillator 26 upon closing of only switch 33a coincides with oscillation frequency $f_B$ upon closing of only switch 33b. However, when core member 34 is deviated from the reference position, a difference between oscillation frequencies $f_A$ and $f_B$ occurs. This frequency difference $\Delta f(=f_A-f_B)$ corresponds to the movement distance of core member 34 from the reference position. The relationship between frequency difference $\Delta f$ and the movement distance is approximately linear, as shown in FIG. 6.

Oscillation frequencies $f_A$ and $f_B$ of oscillator 26 are detected from the emitter terminal of transistor 27 connected to an intermediate point between capacitors 28 and 29 and are counted by counter 35. The count values of counter 35 are converted into digital values $f_A$ and $f_B$ and are then input to process and control section 36. Process and control section 36 comprises a microcomputer and includes memory unit 37 having various I/O ports, a ROM, a RAM, and the like.

Figure 11:
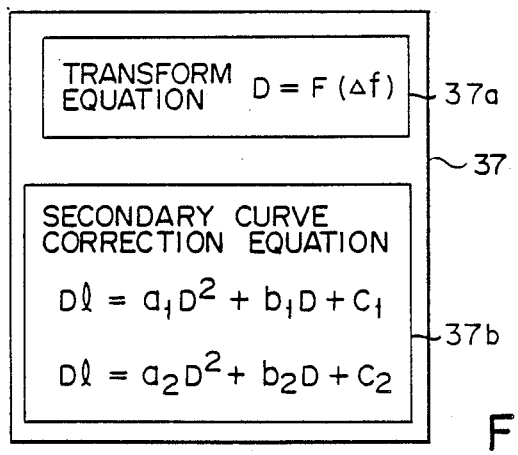
FIG. 11 is a view showing contents of a memory in a memory unit included in a calculation control section.

As shown in FIG. 11, memory unit 37 constituted by the ROM in process and control section 36 includes section 37a and 37b. Section 37a stores a linear transform equation for approximately calculating movement distance D in accordance with frequency difference $\Delta f$ in the oscillation frequency as follows:

$$D=F(\Delta f)$$

Section 37b stores secondary curvature correction equations in order to approximate calculated movement distance D to true movement distance l as follows:

$$D1=a1.D^2+b1.D+c1 \text{ (positive side)}$$

$$D1=a2.D^2+b2.D+c2 \text{ (negative side)}$$

Note that a1, a2, b1, b2, c1, and c2 are experimentally calculated.

Operation of process and control section 36 will be described below with reference to a flow chart in FIG. 12.

In step S1, switches 33a and 33b are alternately opened/closed in response to a time interruption signal input from timer 38 at every predetermined time, so that frequency difference $\Delta f(=f_A-f_B)$ is calculated in accordance with oscillation frequencies $f_A$ and $f_B$ input from counter 35. In step S2, movement distance D of probe 23 from the reference position is calculated using transform equation $D=F(\Delta f)$ stored in memory unit 37. In step S3, a sign of calculated movement distance D is distinguished and a secondary curve correction equation corresponding to the sign is read out from memory unit 37. Then, movement distance D1 approximate to true movement distance l is calculated using the readout secondary curve correction equation (Steps 4, 5). Calculated movement distance D1 is input to display unit 25 (Step S6).

Battery 39 and power source circuit 40, connected to battery 39, for supplying driving voltage $V_D$ to electronic circuits are incorporated in casing 21.

In the displacement measuring apparatus having the above arrangement, frequency difference $\Delta f$ is calculated in accordance with oscillation frequencies $f_A$ and $f_B$ counted by counter 35, and approximate movement distance D is calculated in accordance with this frequency difference $\Delta f$ using a linear transform equation $D=F(\Delta f)$. Movement distance D1 approximate to true movement distance l is calculated in accordance with calculated movement distance D, using the secondary curve correction equation stored in memory unit 37.

As described above, calculated movement distance D is corrected again using the secondary curve correction equation so that movement distance D1 approximate to true movement distance l can be obtained. As a result, measurement precision of the displacement measuring apparatus of the present invention can be greatly improved as compared to that of the conventional displacement measuring apparatus.

Figure 13:
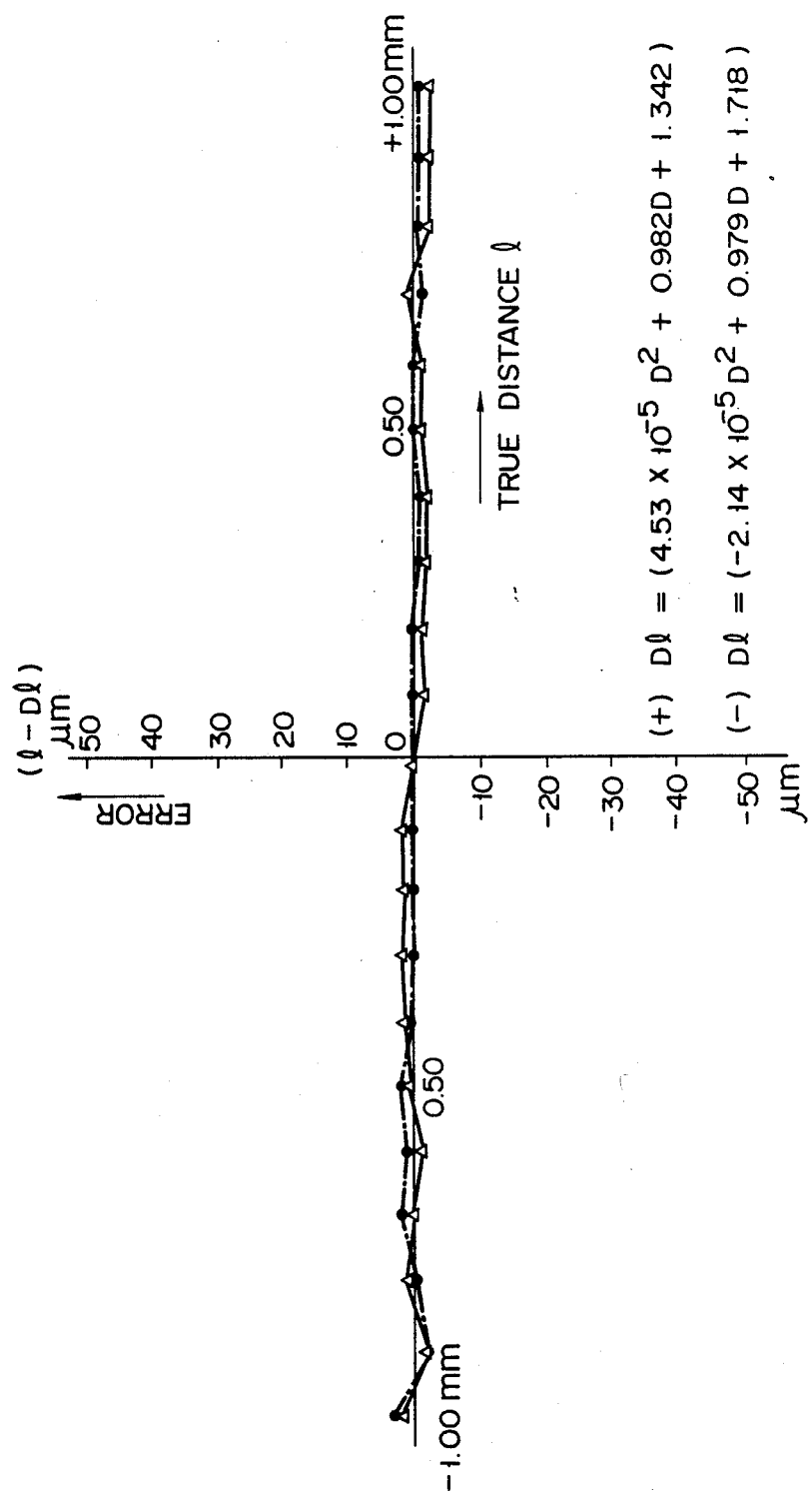
FIG. 13 is a graph showing a relationship between an error and the true movement distance calculated by the displacement measuring apparatus of the present invention.

FIG. 13 is a graph showing a relationship between true movement distance l of probe 23 measured by another measuring apparatus, and error (l−Dl) between this true movement distance l and movement distance Dl calculated by the displacement measuring apparatus of this embodiment. As can be seen from FIG. 13, a maximum error is reduced to 10 μm (0.01 mm) or less. Therefore, measurement precision of the displacement measuring apparatus is greatly improved.

Although the embodiment of the present invention has been described above, the invention is not limited to the above embodiment, and various changes and modifications can be effected within the spirit and scope of the invention.

What is claimed is:

1. A displacement measuring apparatus comprising:
   probe means for contacting to an object;
   oscillator means for generating a signal having an oscillation frequency in accordance with a movement of said probe means;
   counter means for counting the oscillation frequency of the signal generated in said oscillator means; and
   process and control means for calculating a movement distance of said probe means in accordance with a change in the oscillation frequency and for correcting the calculated movement distance using a secondary transform equation representing a secondary curvature relationship between the amount of change in the oscillation frequency and the movement distance; and
   display means for displaying distance data representing the movement distance corrected by said process and control means.

2. The apparatus according to claim 1, wherein said process and control means calculates the movement distance using a primary transform equation.

3. The apparatus according to claim 2, wherein said process and control means includes means for storing the primary transform equation.

4. The apparatus according to claim 1, wherein said process and control means corrects the movement distance calculated by the movement distance calculating means using a transform equation representing a secondary curvature relationship between the change in the oscillation frequency and the movement distance.

5. The apparatus according to claim 1, wherein said process and control means includes means for storing the secondary transform equation.

* * * * *